US009366918B2

United States Patent
Cheng

(10) Patent No.: US 9,366,918 B2
(45) Date of Patent: Jun. 14, 2016

(54) LIQUID CRYSTAL DISPLAY PANEL AND DISPLAY DEVICE

(71) Applicant: BOE TECHNOLOGY GROUP CO., LTD., Beijing (CN)

(72) Inventor: Hongfei Cheng, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 196 days.

(21) Appl. No.: 14/367,331

(22) PCT Filed: Dec. 16, 2013

(86) PCT No.: PCT/CN2013/089490
§ 371 (c)(1),
(2) Date: Jun. 20, 2014

(87) PCT Pub. No.: WO2015/010422
PCT Pub. Date: Jan. 29, 2015

(65) Prior Publication Data
US 2015/0253634 A1    Sep. 10, 2015

(30) Foreign Application Priority Data

Jul. 25, 2013 (CN) .......................... 2013 1 0317263

(51) Int. Cl.
G02F 1/1343 (2006.01)
G02F 1/1333 (2006.01)
G02F 1/1368 (2006.01)

(52) U.S. Cl.
CPC ........ *G02F 1/134336* (2013.01); *G02F 1/1368* (2013.01); *G02F 1/133345* (2013.01); *G02F 1/134309* (2013.01); *G02F 2001/134345* (2013.01); *G02F 2001/134354* (2013.01)

(58) Field of Classification Search
CPC ....................... G09G 3/3648; G02F 1/133707
USPC ................................................ 349/141, 144
See application file for complete search history.

(56) References Cited

U.S. PATENT DOCUMENTS 7,443,458 B2   10/2008   Ahn
8,125,599 B2    2/2012   Kim et al.
(Continued)

FOREIGN PATENT DOCUMENTS

CN    1573486 A    2/2005
CN    1892388 A    1/2007
(Continued)

OTHER PUBLICATIONS

Chinese Office Action of Chinese Application No. 201310317263.0, mailed May 26, 2015 with English translation.
(Continued)

*Primary Examiner* — Lucy Chien
(74) *Attorney, Agent, or Firm* — Collard & Roe, P.C.

(57) ABSTRACT

A liquid crystal (LC) display panel and a display device for providing an LC display panel and a display device with broader viewing angle. The LC display panel includes a first substrate (11) and a second substrate (21) oppositely disposed; an LC layer (4) located between the first substrate (11) and the second substrate (21); a color resin layer (23) located on a side of the second substrate (21) close to the LC layer (4); and a common electrode (12) and a pixel array located in different layers on a side of the first substrate (11) close to the LC layer (4), wherein each sub-pixel units in a corresponding area of the pixel array includes a first pixel electrode (1) and a second pixel electrode (2), and a coupling electrode (3) located in an area adjacent to both the first pixel electrode (1) and the second pixel electrode (2) and configured to create a coupling capacitance with the second pixel electrode (3). The LC molecules located above the first pixel electrode (1) and the second pixel electrode (2) have different incline angles, which broaden the viewing angle of the LC display panel. In addition, an electric field is generated between the first pixel electrode (1) and the second pixel electrode (2), so that a horizontal electric field subjected by the LC molecules in the LC layer (4) is strengthened, which reduces the driving voltage of the LC display panel and improves the image display quality.

20 Claims, 4 Drawing Sheets

(56) References Cited

U.S. PATENT DOCUMENTS

| | | | |
|---|---|---|---|
| 2005/0024571 A1* | 2/2005 | Nakayoshi | G02F 1/1343 349/141 |
| 2005/0078263 A1* | 4/2005 | Kim | G02F 1/1393 349/144 |
| 2008/0151169 A1 | 6/2008 | Park et al. | |
| 2011/0194061 A1 | 8/2011 | Yoso et al. | |
| 2014/0139773 A1 | 5/2014 | Shen et al. | |

FOREIGN PATENT DOCUMENTS

| | | |
|---|---|---|
| CN | 201853033 U | 6/2011 |
| CN | 102147549 A | 8/2011 |
| CN | 102998855 A | 3/2013 |
| CN | 202870440 U | 4/2013 |
| CN | 103412447 A | 11/2013 |
| CN | 203480173 U | 3/2014 |

OTHER PUBLICATIONS

Second Chinese Office Action of Chinese Application No. 201310317263.0, mailed Aug. 13, 2015 with English translation.
English translation of the Written Opinion of the International Searching Authority of PCT/CN2013/089490, mailed Apr. 3, 2014.
International Search Report, International Preliminary Report on Patentability and Written Opinion of the International Searching Authority of PCT/CN2013/089490 in Chinese, mailed Apr. 3, 2014.
Third Chinese Office Action of Chinese Application No. 201310317263.0, mailed Nov. 24, 2015 with English translation.
English Translation of the International Search Report of PCT/CN2013/089490 published in English on Jan. 29, 2015.

* cited by examiner

LIQUID CRYSTAL DISPLAY PANEL AND DISPLAY DEVICE

CROSS REFERENCE TO RELATED APPLICATIONS

This application is the National Stage of PCT/CN2013/089490 filed on Dec. 16, 2013, which claims priority under 35 U.S.C. §119 of Chinese Application No. 201310317263.0 filed on Jul. 25, 2013, the disclosure of which is incorporated by reference.

TECHNICAL FIELD

Embodiments of the present invention relate to a liquid crystal (LC) display panel and a display device.

BACKGROUND

A thin film transistor liquid crystal display (TFT-LCD) has characteristics such as small size, low power consumption, no radiation and the like, and has dominated in the current market of the flat panel display.

Depending on the display modes, the LCD can be classified into Twisted Nematic (TN) mode LCD, In Plane Switching (IPS) mode LCD and Advanced Super Dimension Switch (ADS) mode LCD. The ADS mode LCD creates a multi-dimensional electrical field consisted of an electric field generated by edges of slit electrodes in a same plane and an electric field generated between a slit electrode layer and a plate electrode layer, in the LCD. This electric field is a horizontal electric field which can rotate all the oriented LC molecules located between the slit electrodes and direct above the electrodes in the LC cell, which improves the working efficiency of LC and increases the transmissivity and the viewing angle for display. The ADS technology can improve the image quality of TFT-LCD, and have advantages of high resolution, high transmissivity, low power consumption, broad viewing angle, high aperture ratio, low color distortion, no push Mura and the like.

The ADS mode LCD achieves a display effect of broader viewing angle by creating a multi-dimensional electrical field from the electric field generated between the common electrode and the pixel electrodes located on the array substrate. For a current ADS mode LCD, the magnitude of the viewing angle thereof needs to be further increased.

SUMMARY

Embodiments of the present invention provide an LC display panel and a display device, to provide an LC display panel and a display device having relatively broader viewing angle.

To achieve the described objective, the LC display panel provided by the embodiments of the present invention comprises: a first substrate and a second substrate oppositely provided; an LC layer located between the first substrate and the second substrate; a color resin layer located on a side of the second substrate close to the LC layer; and a common electrode and a pixel array provided in different layers on a side of the first substrate close to the LC layer.

In an example, the first pixel electrode comprises a plurality of slits arranged at a same orientation; each of the slits has a bending point in a central area thereof and is bent towards a first preset direction, so that two end points and the bending point of the slit form an isosceles triangle, with the bending point as a vertex; and the second pixel electrode comprises a plurality of slits which are arranged at the same orientation with that of the slits in the first pixel electrode; each of the slits in the second pixel electrode has a bending point in a central area thereof and is bent towards a second preset direction, so that two end points and the bending point of the slit form an isosceles triangle, with the bending point as a vertex.

In an example, the slits in the first pixel electrode and the slits in the second pixel electrode each have a shape of an angle bracket or a round bracket.

In an example, the slits in the first pixel electrode and the slits in the second pixel electrode each extend along a direction of a short side of a rectangle-shaped sub-pixel unit.

In an example, the first preset direction is identical with the second preset direction; or the first preset direction is opposite to the second preset direction.

In an example, the coupling electrode is located between the common electrode and each of the first pixel electrode and the second pixel electrode, and is electrically insulated from the common electrode and the second pixel electrode.

In an example, the coupling electrode is electrically connected to the first pixel electrode through a via hole.

In an example, the LC display panel further comprises a switch transistor located in the sub-pixel unit, wherein the coupling electrode is electrically connected to a drain electrode of the switch transistor.

In an example, the coupling electrode is a rectangle-shaped electrode with a long side paralleling a direction along which the slit extends.

In an example, the LC display panel further comprises a first insulating layer and a second insulating layer; the common electrode is located on the first substrate; the second insulating layer is located over the common electrode; the coupling electrode is located on the second insulating layer; the first insulating layer is located over the coupling electrode; and the first pixel electrode and the second pixel electrode each is located on the first insulating layer.

In an example, the first insulating layer is a gate insulating layer, and the second insulating layer is a passivation layer.

Embodiments of the present invention provide a display device comprising the described liquid crystal (LC) display panel.

BRIEF DESCRIPTION OF THE DRAWINGS

Embodiments of the present invention will be described in more detail below with reference to the accompanying drawings to enable those skilled in the art to understand the present invention more clearly, wherein.

DETAILED DESCRIPTION OF THE PREFERRED EMBODIMENTS

Figure 1:
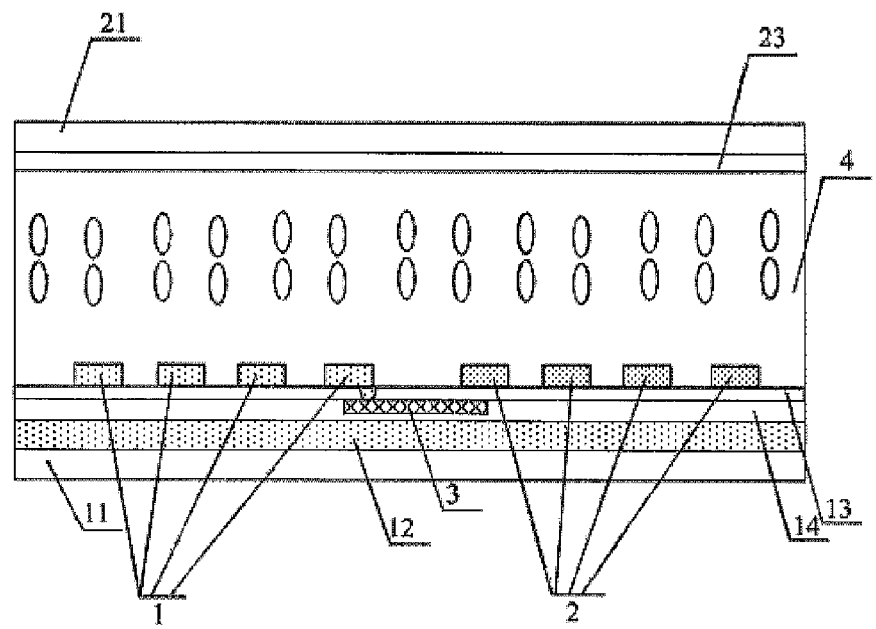
FIG. 1 is a schematically structural view of an LC display panel provided by an embodiment of the present invention.

To make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Embodiments of the present invention provide a liquid crystal (LC) display panel and a display device, to provide an LC display panel and a display device with broader viewing angle.

Embodiments of the present invention provide an LC display panel with an improved ADS display mode. The array substrate is provided with a first pixel electrode and a second pixel electrode at each of the areas where sub-pixel units are located thereon, and a coupling electrode located in an area adjacent to the first pixel electrode and the second pixel electrode. The coupling electrode is configured to generate a coupling capacitance with the second pixel electrode, so that a voltage difference is generated between the first pixel electrode and the second pixel electrode, which allows the LC molecules located above the first pixel electrode and the second pixel electrode have different incline angles, thereby broadening the viewing angle of the LC display panel. In addition, an electric field is generated between the first pixel electrode and the second pixel electrode, so that a horizontal electric field (an electric field parallels the first substrate) subjected by the LC molecules in the LC layer is strengthened, which reduces the driving voltage of the LC display panel and improves the quality of the image display.

It should be noted that a thickness of each of functional films/layers as shown in drawings of the embodiments of the present invention does not intend to reflect the actual thickness thereof, and the relative thickness between these functional films/layers does not intend to reflect the actual relative thickness there-between, either. The drawings as provided by the embodiments of the present invention are illustrated for explaining the present invention by way of examples only, but not for limiting the present invention.

The present invention will be described with reference to structures of an array substrate and a color filter (CF) substrate corresponding to one sub-pixel unit in the LC display panel as an example.

Referring to FIG. 1 which is a schematically sectional view of an LC display panel provided by an embodiment of the present invention, the LC display panel comprises: a first substrate 11 and a second substrate 21 that are oppositely disposed, and an LC layer 4 located between the first substrate 11 and the second substrate 21.

A side of the first substrate 11 that is close to the LC layer 4 is provided with a common electrode 12 and a pixel array located on the common electrode 12. Each of the sub-pixel unit areas in the pixel array is provided with a first pixel electrode 1 and a second pixel electrode 2, and a coupling electrode 3 located in an area adjacent to the first pixel electrode 1 and the second pixel electrode 2. The second pixel electrode 2 is insulated from the coupling electrode 3 through a first insulating layer 13, and the coupling electrode 3 is insulated from the common electrode 12 through a second insulating layer 14.

Each of the sub-pixel unit areas in the pixel array is provided with a first pixel electrode and a second pixel electrode, and a coupling electrode located in an area adjacent to both the first pixel electrode and the second pixel electrode and configured to create a coupling capacitance with the second pixel electrode. When the first pixel electrode is applied with a data signal voltage $V_{Data1}$, a data signal voltage $V_{Data2}$ is generated across the second pixel electrode by an action of the coupling electrode, where $V_{Data1} \neq V_{Data2}$. The LC molecules located above the first pixel electrode and above the second pixel electrode have different incline angles, which increases the viewing angle of the LC display panel. In addition, an electric field is generated between the first pixel electrode and the second pixel electrode, so that a horizontal electric field (an electric field parallels the first substrate) subjected by the LC molecules in the LC layer is strengthened, which reduces the driving voltage of the LC display panel and improves the image display quality.

A side of the second substrate 21 that is adjacent to the LC layer 4 is provided with a color resin layer 23.

During implementing, where a data signal voltage across the coupling electrode 3 and a data signal voltage across the first pixel electrode 1 have identical values, the coupling electrode 3 generates a coupling capacitance with the second pixel electrode 2 such that the second pixel electrode 2 is applied with a certain voltage thereon. The voltage applied on the first pixel electrode and the voltage applied on the second pixel electrode have different values, so that the LC molecules located above the first pixel electrode and the second pixel electrode have different incline angles, which increases the viewing angle of the LC display panel.

In addition, an electric field is generated between the first pixel electrode and the second pixel electrode, so that a horizontal electric field (an electric field parallels the first substrate) subjected by the LC molecules in the LC layer is strengthened, which reduces the driving voltage of the LC display panel and improves the image display quality.

It should be noted that the color resin layer 23 as shown in the drawings of the present invention merely intends to illustrate its relative location with the first pixel electrode and the second pixel electrode, but not the specific structure of the color resin layer. During implementing, the configuration and structure of the color resin layer 23 are similar with that in conventional technology, thus detailed description is omitted.

Figure 2:
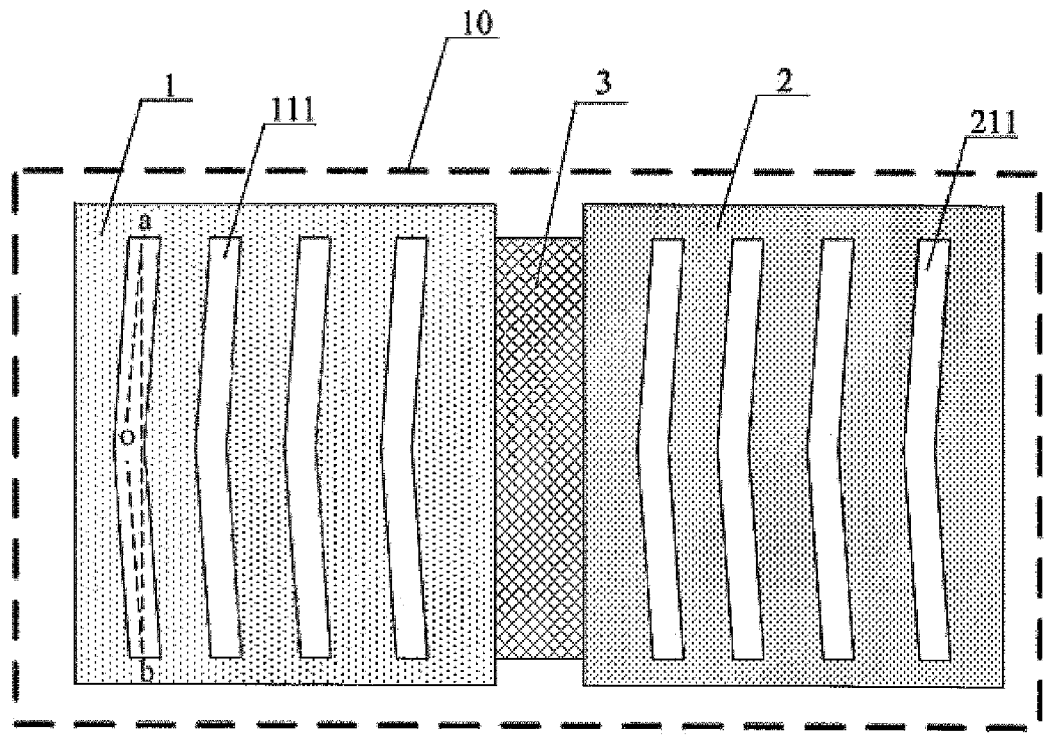
FIG. 2 is a first schematically structural view of pixel electrodes located in one sub-pixel unit provided by an embodiment of the present invention.

Referring to FIG. 2, which is a schematically top view of the LC display panel as shown in FIG. 1, an area of each sub-pixel unit 10 in the pixel array is provided with a first pixel electrode 1 and a second pixel electrode 2, and a coupling electrode 3 located in an area adjacent to the first pixel electrode 1 and the second pixel electrode 2.

The first pixel electrode 1 comprises a plurality of slits 111 which are arranged at a same orientation. Each of the slits 111 has a bending point at its central area and is bent towards a first preset direction, so that two end points of the slit 111 (the end a and the end b of the first slit 111 as shown at the left side of FIG. 2) and the bending point (the point o in FIG. 2) form an isosceles triangle (as indicated by the isosceles triangle depicted in closed, dashed lines as shown in FIG. 2), where the bending point as a vertex. The second pixel electrode 2 is configured in a similar manner with that of the first pixel electrode 1, and comprises a plurality of slits 211 which are arranged at the same orientation with that of slits 111 in the first pixel electrode 1. Each of the slits 211 has a bending point at its central area and is bent towards a second preset direction, so that two end points and the bending point of the slit 211 form an isosceles triangle with the bending point as a vertex. The first pixel electrode and the second pixel electrode both are electrodes having bending shape slits. The first pixel electrode or the second pixel electrode enables the LC molecules to be distributed in multiple domains, e.g., at least in dual domains. The LC molecules corresponding to the first pixel electrode and the second pixel electrode located in one sub-pixel unit are distributed in at least four domains, which increases the viewing angle of the LC display panel and reduces the driving voltage of the LC display panel. The first pixel electrode and the second pixel electrode each comprise slit-like electrodes with a bending angle, so that the LC molecules are distributed in multiple domains to a greater extent, so as to achieve a multi-domain display of the LC display panel and further increase the viewing angle of the LC display panel.

In an example, the slits in the first pixel electrode and the slits in the second pixel electrode each have a shape of an angle bracket "<" or ">" or has a shape of a round bracket "(" or ")", so that the LC molecules are distributed in multiple domains on the pixel electrodes at both sides of the slits. Generally, an area where the sub-pixel unit is located is rectangular-shaped. As shown in FIG. 2, the sub-pixel unit 10 is rectangular-shaped. The first pixel electrode 1 and the second pixel electrode 2 have similar sizes and shapes, and are arranged along a long side of the rectangle-shaped sub-pixel unit 10. The first pixel electrode 1 and the second pixel electrode 2 are spaced by an interval.

In an embodiment, the slits in the first pixel electrode 1 and the slits in the second pixel electrode 2 each extend along a direction of a short side of the rectangle-shaped sub-pixel unit 10.

In an embodiment, referring to FIG. 2, the coupling electrode 3 is located in an area corresponding to the interval between the first pixel electrode 1 and the second pixel electrode 2. The coupling electrode 3 applied with a voltage and the second pixel electrode 2 have a coupling capacitance there-between. The second pixel electrode 2 induces an amount of charges under an action of the coupling capacitance to generate a voltage.

In order to increase the coupling capacitance between the coupling electrode 3 and the second pixel electrode 2, and hence to increase the voltage across the second pixel electrode 2, in an embodiment, projections of the coupling electrode 3 and of the second pixel electrode 2 in vertical direction have an overlapped area, so that the coupling capacitance between the coupling electrode 3 and the second pixel electrode 2 is increased, and hence the voltage across the second pixel electrode 2 is increased.

The coupling electrode is not limited in the size and shape as illustrated, provided that it is located in an area adjacent to the first pixel electrode and the second pixel electrode and it generates a capacitance by coupling with the second pixel electrode.

In an embodiment, the coupling electrode is rectangular-shaped, and has a long side extending in the same direction with that of the slit. The coupling capacitor has a length substantially the same with that of the slit, and has a width slightly larger than that of the interval between the first pixel electrode and the second pixel electrode.

The pixel in each sub-pixel unit of the pixel array is structured identically with that as shown in FIG. 2, and the structure as shown in FIG. 2 is a structure of a pixel in an area corresponding to one sub-pixel unit 10.

In an embodiment, the voltage across the coupling electrode is identical with that across the first pixel electrode, thus the coupling electrode can be directly connected to the first pixel electrode or directly connected to a data line which supplies data signal voltage, or connected to a drain electrode of a switch transistor disposed in the sub-pixel unit. The configurations of the coupling electrode will be described below in details.

Figure 3:
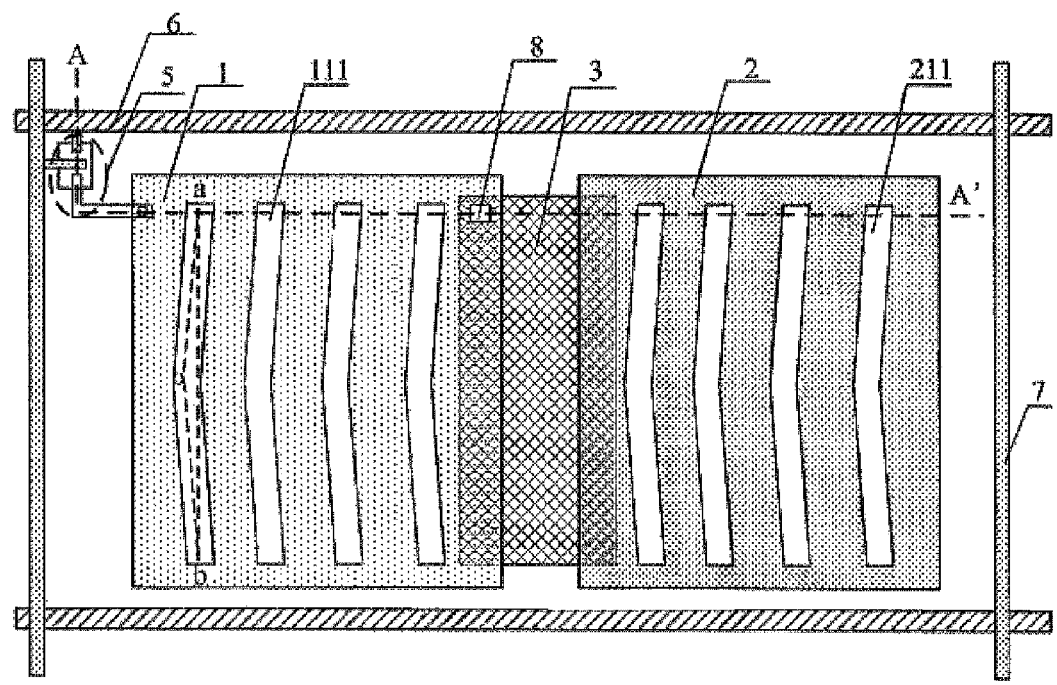
FIG. 3 is a second schematically structural view of pixel electrodes located in one sub-pixel unit provided by an embodiment of the present invention.

During implementing, as shown in FIG. 3, each sub-pixel unit further comprises a switch transistor TFT5 which controls the sub-pixel to switch on or switch off. Each sub-pixel unit is formed and surrounded by gate lines 6 connected to a gate electrode of TFT5 and data lines 7 connected to a source electrode of TFT5. The gate line 6 controls TFT5 to switch on or switch off, and the data line 7 outputs a data signal voltage $V_{Data1}$ for the first pixel electrode when TFT5 is switched on.

A drain electrode of TFT5 is connected to the first pixel electrode 1 through a via hole. When TFT5 is switched on, the source electrode and drain electrode of TFT5 are conducted, and the data line provides the first pixel electrode 1 with the data signal voltage $V_{Data1}$.

The first configuration: as shown in FIG. 3, the coupling electrode 3 is connected to the first pixel electrode 1 through a via hole 8.

Figure 4:
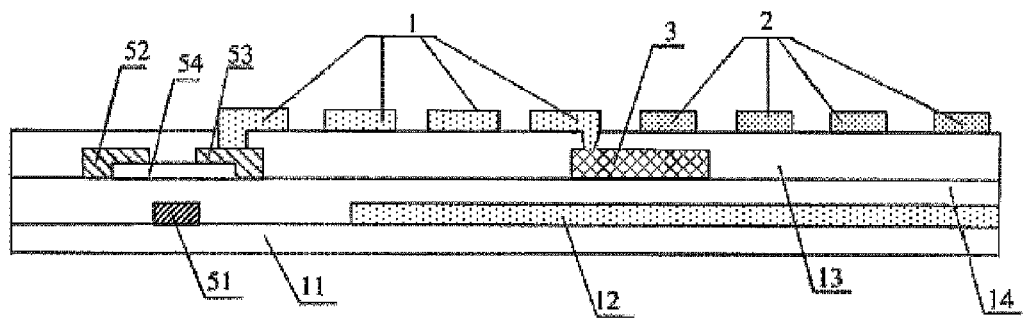
FIG. 4 is a sectional view of the structure as shown in FIG. 3 along A-A' direction.

To clearly explain the location relation between the coupling electrode and the first pixel electrode, the second pixel electrode as well as TFT5, FIG. 4 is referred, which is a sectional view of the structure as shown in FIG. 3 along A-A' direction.

As shown in FIG. 4, the first substrate 11 is provided with a common electrode 12, and a gate electrode 51 of the switch transistor TFT5 thereon.

The gate electrode 51 and the common electrode 12 are provided with a second insulating layer 14 thereover, which is a gate insulating layer GI.

A semiconductor layer 54 of TFT, a source electrode 52 and a drain electrode 53 that are connected to the conductor layer 54, as well as a coupling electrode 3 disposed in a same layer with the drain electrode 53, are all disposed on or above the second insulating layer 14.

The first insulating layer 13 is located over the semiconductor layer 54, the source electrode 52 and the drain electrode 53, and the coupling electrode 3. The first insulating layer 13 is provided with a via hole located above the drain electrode 53 and a via hole located above the coupling electrode 3.

The first pixel electrode 1 and the second pixel electrode 2 are located on the first insulating layer 13; the first pixel electrode 1 is electrically connected to the drain electrode 53 through the via hole above the drain electrode 53, and the coupling electrode 3 is electrically connected to the first pixel electrode 1 through the via hole above the coupling electrode 3. The first insulating layer is a passivation layer above the first substrate.

Figure 5:
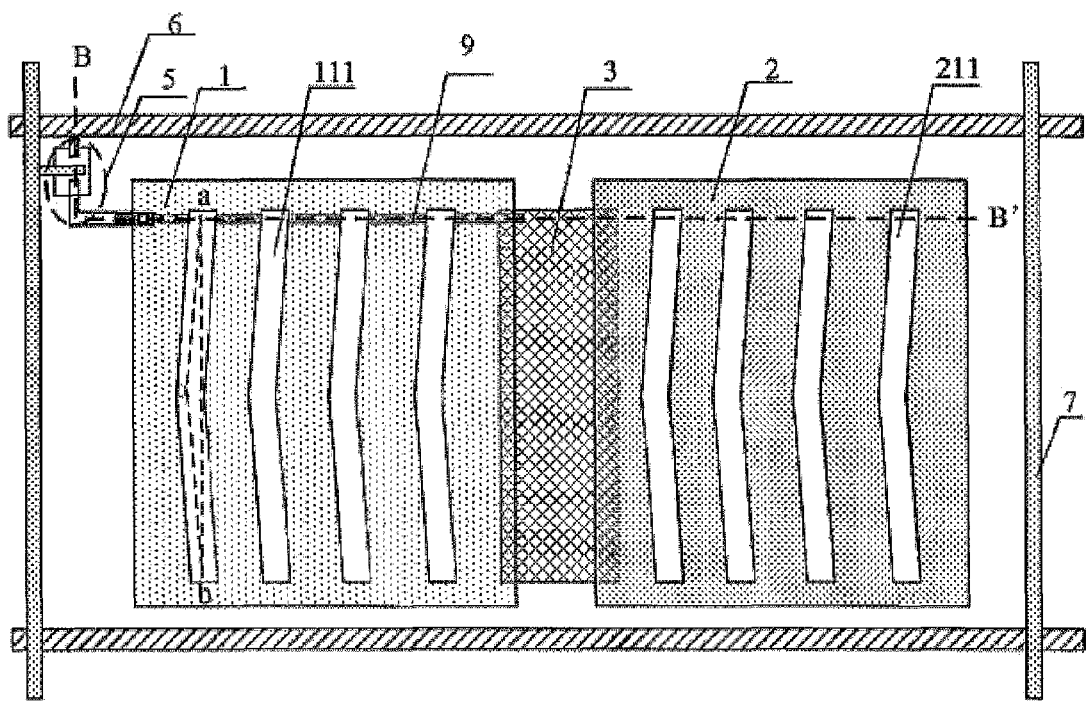
FIG. 5 is a third schematically structural view of pixel electrodes located in one sub-pixel unit provided by an embodiment of the present invention.

The second configuration: referring to FIG. 5, the coupling electrode 3 is directly connected to the drain electrode 53 of TFT5 through a lead 9.

Figure 6:
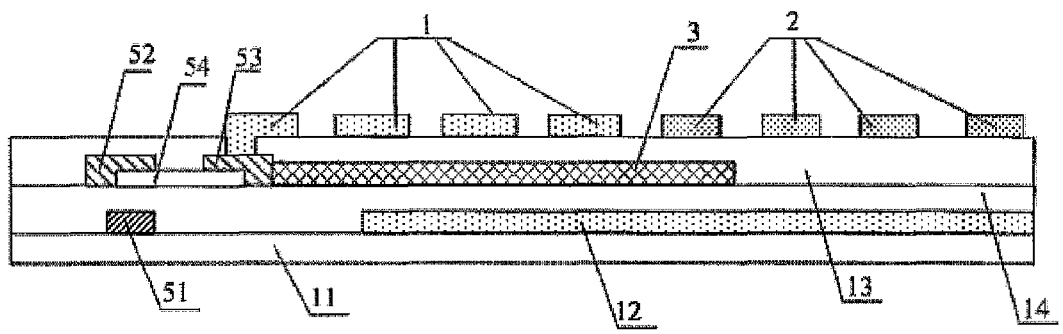
FIG. 6 is a sectional view of the structure as shown in FIG. 5 along B-B' direction.

Referring to FIG. 6 which is a sectional view of the structure as shown in FIG. 5 along B-B' direction.

The structure in FIG. 6 is similar with that in FIG. 4, and the difference is that the coupling electrode 3 is directly connected to the drain electrode 53 disposed in the same layer.

The principle of the configuration of the coupling electrode as provided by the embodiment of the present invention of increasing the viewing angle of the LC display panel is explained below in details.

Figure 7:
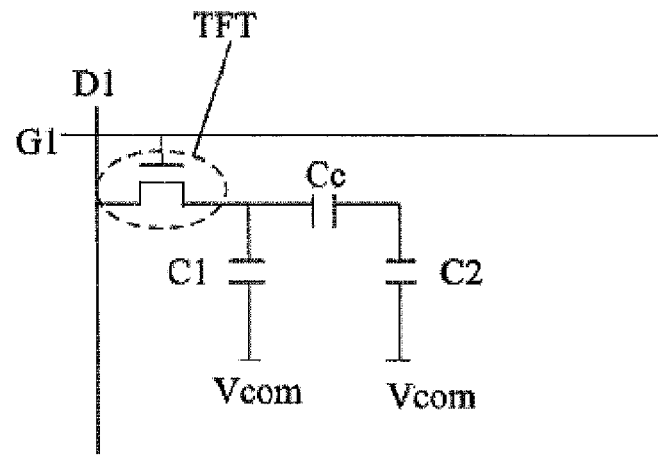
FIG. 7 is a diagram of equivalent circuitry among the pixel electrodes, the coupling electrode and the common electrode located in one sub-pixel unit.

Referring to FIG. 7 which is a diagram of equivalent circuitry among the coupling electrode 3, the first pixel electrode 1 and the second pixel electrode 2, as well as the common electrode 12 in the structure as shown in FIG. 4 or FIG. 6.

Combining FIG. 4 with FIG. 7, the first pixel electrode 1 and the common electrode 12 in FIG. 4 have a pixel capacitance C1 there-between, as shown in FIG. 7. The common electrode 12 corresponds to a common voltage $V_{com}$ supplied by the common electrode in FIG. 7. The second pixel electrode 2 and the common electrode 12 have a pixel capacitance C2 there-between. The coupling electrode 3 and the second pixel electrode 2 have a coupling capacitance Cc there-between. Referring to FIG. 7, the coupling capacitance Cc is concatenated between the pixel capacitance C1 and the pixel capacitance C2. When a scanning signal of the gate line G1 enables the TFT to switch on, the data line D1 provides the first pixel electrode with a data signal voltage $V_{Data1}$. Due to the existence of the coupling capacitance Cc, the second pixel electrode 2 will instantaneously generate an amount of charges by coupling to correspondingly form a data signal voltage $V_{Data2}$, where $V_{Data1} \neq V_{Data2}$, so that the first pixel electrode and the second pixel electrode are applied with data signal voltages having different values. Also, the first pixel electrode and the second pixel electrode are electrodes with bending slits, and such type of electrodes themselves enable the LC molecules to be distributed in multiple domains. At the same time, when the data signal voltages of the first pixel electrode and the second pixel electrode are different, each of the first pixel electrode and the second pixel electrode generates an electric field with the common electrode; and a horizontal electric field is also created between the first pixel electrode and the second pixel electrode; so that the horizontal electric field in the LC layer is strengthened, and the LC molecules can be distributed in multiple domains to a greater extent, thus the viewing angle of the LC display panel becomes broader.

In an embodiment, a bending direction of the slit in the first pixel electrode is the same with or opposite to a bending direction of the slit in the second pixel electrode.

As shown in FIG. 2, FIG. 3 and FIG. 5, the bending direction of the slit 111 in the first pixel electrode 1 is the same with the bending direction of the slit 211 in the second pixel electrode 2.

Figure 8:
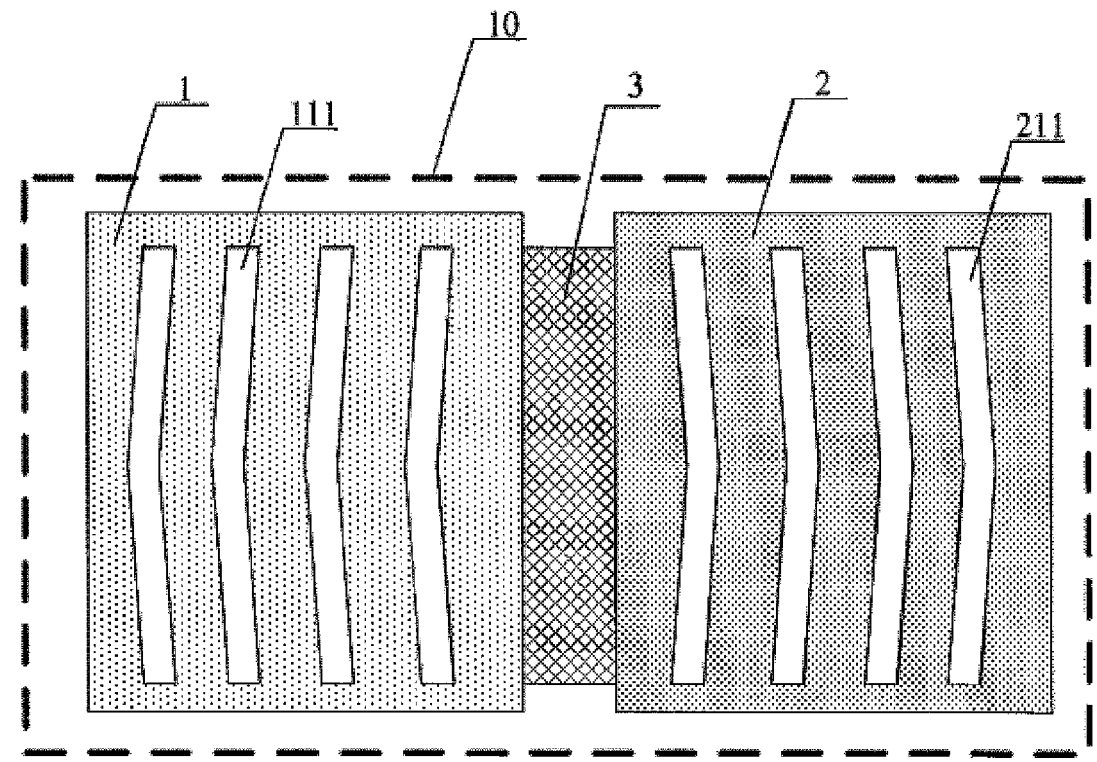
FIG. 8 is a fourth schematically structural view of pixel electrodes located in one sub-pixel unit as provided by an embodiment of the present invention.

Referring to FIG. 8, the bending direction of the slit 111 in the first pixel electrode 1 is opposite to the bending direction of the slit 211 in the second pixel electrode 2. With such configuration, a distribution direction of the LC molecules in an area corresponding to the first pixel electrode 1 is opposite to a distribution direction of the LC molecules in an area corresponding to the second pixel electrode 2, and the LC molecules can be distributed in multiple domains to an even further greater extent, thus the viewing angle of the LC display panel is further broadened.

It should be noted that the array substrate in embodiments of the present invention comprises a first substrate and functional structures on the first substrate; and the color filter substrate in embodiments of the present invention comprises a second substrate and functional structures on the second substrate.

In an embodiment, the common electrode, the first pixel electrode and the second pixel electrode are transparent film layers of metal oxide, for example, indium tin oxide (ITO) or indium zinc oxide (IZO). Transparent electrodes enable a light on a light entrance side of the LC display panel to smoothly pass there-through without influencing the aperture ratio of the pixels and the transmissivity of the lights.

In an embodiment, the coupling electrode is a transparent film layer of metal oxide, for example, ITO or IZO. A transparent electrode enables a light on a light entrance side of the LC display panel to smoothly pass there-through without influencing the aperture ratio of the pixels and the transmissivity of the lights.

In the LC display panel as shown in FIG. 1, the common electrode 12, the first pixel electrode 1 and the second pixel electrode 2 are located in different layers of the first substrate 11, and the common electrode 12 is located below the first pixel electrode 1 and the second pixel electrode 2. The LC display panel provided by embodiments of the present invention is not limited to the structure as shown in FIG. 1, for example, in another embodiment, the first pixel electrode and the second pixel electrode are located below the first common electrode.

In the LC display panel as shown in FIG. 1, the second substrate 21 is provided with a color resin layer 23 thereon, but the implementation is not limited thereto. For example, in another embodiment, the second substrate 21 is further provided with a second common electrode thereon, and the second common electrode is located on a side of the color resin layer away from the LC layer. This facilitates an even stronger density of the multi-dimensional electric field in ADS display mode, which reduces the voltage of the LC display panel for driving the LC molecules to incline, and increases the electro-optic efficiency of the LC display panel for displaying images, and the display quality.

It should be noted that the LC display panels as provided by the embodiments of the present invention are only intended to illustrate the configurations of the pixel electrode and the coupling electrode on the first substrate of the present invention, so that the viewing angle of an LC display panel with ADS display mode is broadened. Therefore, any technical solution that involves the array substrate or LC display panel comprising the first pixel electrode, the second pixel electrode and the coupling electrode as provided by the embodiments of the present invention shall fall within the scope of the present invention.

Embodiments of the present invention also provide a display device comprising the LC display panel. The display device can be an LC display panel, an LCD or an LC TV.

As above, in the LC display panel as provided by embodiments of the present invention, a coupling electrode is disposed between a first pixel electrode and a second pixel electrode located in an area of one-sub pixel unit. The coupling electrode can create a coupling capacitance with the second pixel electrode. When the first pixel electrode is applied with a data signal voltage $V_{Data1}$, a data signal voltage $V_{Data2}$ is generated across the second pixel electrode by an effect of the coupling electrode, where $V_{Data1} \neq V_{Data2}$. The LC molecules located above the first pixel electrode and above the second pixel electrode have different incline angles, which broaden the viewing angle of the LC display panel. In addition, an electric field is generated between the first pixel electrode and the second pixel electrode, so that a horizontal electric field (an electric field parallels the first substrate) subjected by the LC molecules in the LC layer is strengthened, which reduces the driving voltage of the LC display panel and improves the image display quality It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

What is claimed is:

1. A liquid crystal (LC) display panel, comprising:
   a first substrate and a second substrate oppositely provided;
   an LC layer located between the first substrate and the second substrate;
   a color resin layer located on a side of the second substrate close to the LC layer; and
   a common electrode and a pixel array provided in different layers on a side of the first substrate close to the LC layer, wherein the pixel array comprises sub-pixel units, each of the sub-pixel units comprises a first pixel electrode and a second pixel electrode, and a coupling electrode located in an area adjacent to both the first pixel electrode and the second pixel electrode and configured to create a coupling capacitance with the second pixel electrode.

2. The LC display panel according to claim 1, wherein the first pixel electrode comprises a plurality of slits arranged at a same orientation, each of the slits is provided with a bending point in its central area and is bent towards a first preset direction so that two end points and the bending point of the slits form an isosceles triangle with the bending point as a vertex; and
   the second pixel electrode comprises a plurality of slits arranged at the same orientation with that of the slits in the first pixel electrode, each of the slits in the second pixel electrode is provided with a bending point in its central area and is bent towards a second preset direction so that two end points and the bending point of the slits form an isosceles triangle with the bending point as a vertex.

3. The LC display panel according to claim 2, wherein the slits in the first pixel electrode and the slits in the second pixel electrode each have a shape of an angle bracket or a round bracket.

4. The LC display panel according to claim 3, wherein the slits in the first pixel electrode and the slits in the second pixel electrode each extend along a direction of a short side of a rectangular-shaped sub-pixel unit.

5. The LC display panel according to claim 4, wherein the first preset direction is the same with the second preset direction; or the first preset direction is opposite to the second preset direction.

6. The LC display panel according to claim 5, wherein the coupling electrode is located between the common electrode and each of the first pixel electrode and second pixel electrode, and remains insulated from the common electrode and the second pixel electrode.

7. The LC display panel according to claim 6, wherein the coupling electrode is electrically connected to the first pixel electrode through a via hole.

8. The LC display panel according to claim 7, further comprising a switch transistor located in the sub-pixel unit, wherein the coupling electrode is electrically connected to a drain electrode of the switch transistor.

9. The LC display panel according to claim 7, further comprising a switch transistor located in the sub-pixel unit, wherein the coupling electrode is directly connected to a drain electrode of the switch transistor.

10. The LC display panel according to claim 9, wherein the coupling electrode is a rectangular-shaped electrode with a long side paralleling a direction along which the slit extends.

11. The LC display panel according to claim 10, further comprising a first insulating layer and a second insulating layer; wherein
    the common electrode is located on the first substrate;
    the second insulating layer is located over the common electrode;
    the coupling electrode is located on the second insulating layer;
    the first insulating layer is located over the coupling electrode; and
    each of the first pixel electrode and the second pixel electrode is located on the first insulating layer.

12. The LC display panel according to claim 11, wherein the first insulating layer is a gate insulating layer, and the second insulating layer is a passivation layer.

13. A display device, comprising,
    the liquid crystal display panel according to claim 1.

14. The LC display panel according to claim 2, wherein the slits in the first pixel electrode and the slits in the second pixel electrode each extend along a direction of a short side of a rectangular-shaped sub-pixel unit.

15. The LC display panel according to claim 14, wherein the first preset direction is the same with the second preset direction; or the first preset direction is opposite to the second preset direction.

16. The LC display panel according to claim 2, wherein the first preset direction is the same with the second preset direction; or the first preset direction is opposite to the second preset direction.

17. The LC display panel according to claim 3, wherein the first preset direction is the same with the second preset direction; or the first preset direction is opposite to the second preset direction.

18. The LC display panel according to claim 1, wherein the coupling electrode is located between the common electrode and each of the first pixel electrode and second pixel electrode, and remains insulated from the common electrode and the second pixel electrode.

19. The LC display panel according to claim 18, further comprising a switch transistor located in the sub-pixel unit, wherein the coupling electrode is electrically connected to a drain electrode of the switch transistor.

20. The LC display panel according to claim 19, further comprising a switch transistor located in the sub-pixel unit, wherein the coupling electrode is directly connected to a drain electrode of the switch transistor.

* * * * *